(12) United States Patent
Bellem et al.

(10) Patent No.: US 9,851,715 B2
(45) Date of Patent: Dec. 26, 2017

(54) METHOD FOR THE AUTOMATIC OPERATION OF A VEHICLE

(71) Applicant: DAIMLER AG, Stuttgart (DE)

(72) Inventors: Hanna Bellem, Stuttgart (DE); Michael Kleczka, Gerlingen (DE); Klaus-Peter Kuhn, Hochdorf (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 15/101,539

(22) PCT Filed: Nov. 26, 2014

(86) PCT No.: PCT/EP2014/003157
§ 371 (c)(1),
(2) Date: Jun. 3, 2016

(87) PCT Pub. No.: WO2015/086112
PCT Pub. Date: Jun. 18, 2015

(65) Prior Publication Data
US 2016/0313733 A1    Oct. 27, 2016

(30) Foreign Application Priority Data

Dec. 11, 2013    (DE) .................. 10 2013 020 933

(51) Int. Cl.
*G01C 21/00* (2006.01)
*G05D 1/00* (2006.01)
(Continued)

(52) U.S. Cl.
CPC ............. *G05D 1/0061* (2013.01); *B60N 2/02* (2013.01); *B60N 2/0244* (2013.01);
(Continued)

(58) Field of Classification Search
CPC ...... G05D 1/0061; G05D 1/0212; B60N 2/02; B60N 2/0244; B60N 2002/4485;
(Continued)

(56) References Cited

U.S. PATENT DOCUMENTS 8,346,426 B1 *   1/2013   Szybalski ............. B60W 50/14
                                                           701/25
8,428,820 B2     4/2013   Ottenhues et al.
(Continued)

FOREIGN PATENT DOCUMENTS

DE            19919278 A1    11/2000
DE         102005058809 A1     6/2007
(Continued)

OTHER PUBLICATIONS

International Search Report in related International Application No. PCT/EP2014/003157 dated Mar. 11, 2015.
(Continued)

*Primary Examiner* — Shardul D Patel
(74) *Attorney, Agent, or Firm* — Patent Portfolio Builders PLLC

(57) ABSTRACT

A method for the automatic operation of a vehicle in an autonomous driving operation requiring no user action by means of a driver assistance system involves informing a driver of the vehicle in good time about an imminent automatic intervention of the driver assistance system into longitudinal and/or transverse dynamics in the autonomous driving operation by way of an automatic emission of a notice.

17 Claims, 1 Drawing Sheet

(51) Int. Cl.
*B60W 50/14* (2012.01)
*B60W 50/16* (2012.01)
*B60N 2/02* (2006.01)
*B62D 15/02* (2006.01)
*G05D 1/02* (2006.01)
*B60N 2/44* (2006.01)

(52) U.S. Cl.
CPC ............ *B60W 50/14* (2013.01); *B60W 50/16* (2013.01); *B62D 15/029* (2013.01); *G05D 1/0212* (2013.01); *B60N 2002/4485* (2013.01); *B60W 2050/146* (2013.01); *B60W 2720/18* (2013.01)

(58) Field of Classification Search
CPC ............... B60W 50/14; B60W 50/16; B60W 2050/146; B60W 2720/18; B62D 15/029
USPC .......................................................... 701/23
See application file for complete search history.

(56) References Cited

U.S. PATENT DOCUMENTS

| | | | |
|---|---|---|---|
| 8,473,144 B1 | 6/2013 | Dolgov et al. | |
| 8,606,455 B2* | 12/2013 | Boehringer | B60W 30/17 701/23 |
| 2008/0255728 A1* | 10/2008 | Ottenhues | B62D 15/0285 701/41 |
| 2013/0006478 A1* | 1/2013 | Lin | B60N 2/10 701/49 |
| 2013/0179023 A1* | 7/2013 | Schmidt | G05D 1/021 701/23 |
| 2014/0121880 A1* | 5/2014 | Dolgov | B60W 30/095 701/23 |
| 2015/0149035 A1* | 5/2015 | Enthaler | B60K 37/06 701/36 |
| 2015/0302257 A1* | 10/2015 | Takemura | H04N 5/2171 382/104 |

FOREIGN PATENT DOCUMENTS

| | | |
|---|---|---|
| DE | 102006057842 A1 | 6/2008 |
| DE | 102007018665 A1 | 10/2008 |
| DE | 102009048954 A1 | 4/2011 |
| DE | 102009058524 A1 | 6/2011 |
| DE | 102010048822 A1 | 4/2012 |
| DE | 102011121948 A1 | 6/2013 |
| EP | 2540560 A1 | 1/2013 |

OTHER PUBLICATIONS

Written Opinion in related International Application No. PCT/EP2014/003157 dated Mar. 11, 2015.

* cited by examiner

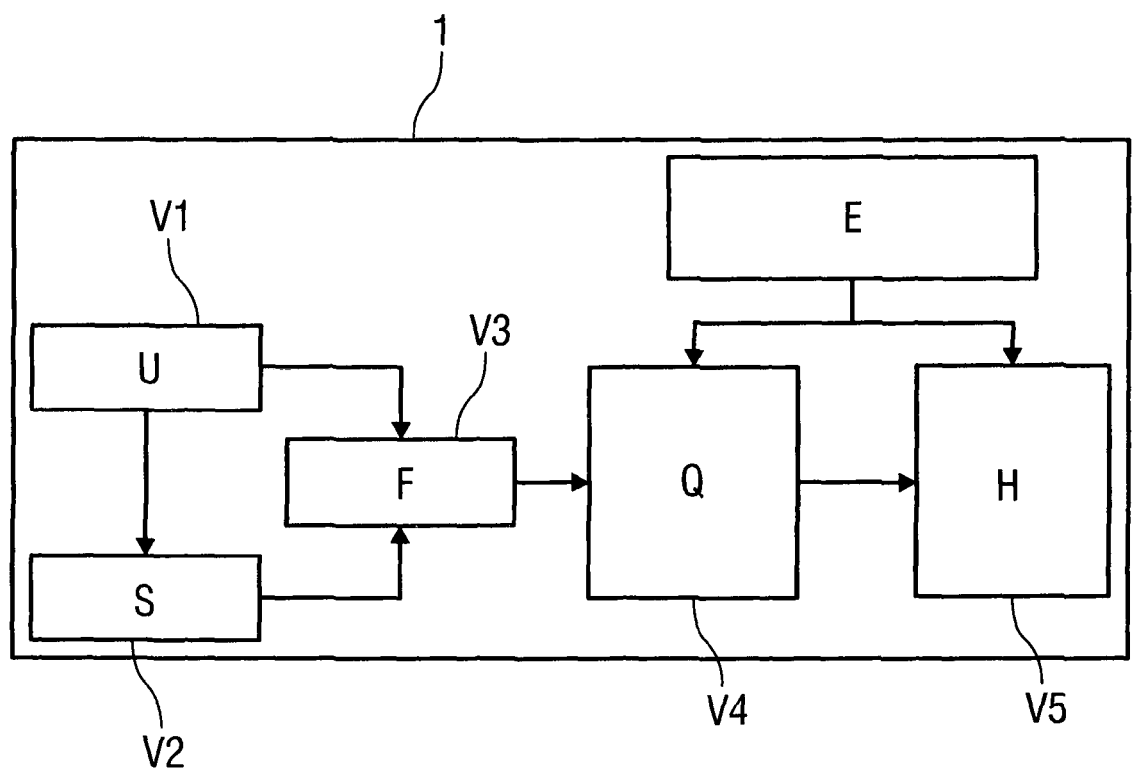

METHOD FOR THE AUTOMATIC OPERATION OF A VEHICLE

BACKGROUND AND SUMMARY OF THE INVENTION

Exemplary embodiments of the invention relate to a method for the automatic operation of a vehicle in an autonomous driving operation requiring no user action by means of a driver assistance system.

German patent document DE 10 2006 057 842 A1 discloses a method for supporting the driver of a vehicle in the lateral control of the vehicle and a driver assistance system for carrying out the method. The method involves recording the surroundings of the vehicle in order to detect objects in the surroundings of the vehicle and/or the course of a lane of traffic being driven along by the vehicle. A lateral control system intervention for the generation of a course-correcting system yawing moment or a course-correcting system yaw rate is triggered when there is the risk that the vehicle could collide with one of the detected objects or could leave the detected lane of traffic. The driver can interrupt the lateral control system intervention by operating the steering wheel of the vehicle, the accelerator pedal of the vehicle and/or the brake pedal of the vehicle, if the extent of the respective operation differs in terms of value from a reference value allocated to the respective operation by more than a predetermined degree of tolerance. The method is employed in a driver assistance system of a vehicle in order to enable control to be taken over from the driver by the lateral control of the vehicle after a systematic triggering of the lateral control system intervention.

Furthermore, German patent document DE 10 2009 048 954 A1 discloses a method and a device for the automatic operation of a vehicle in an autonomous driving operation requiring no user action. The method includes recording a current traffic situation, checking whether the traffic situation fulfils a first criterion and unlocking a function that offers a secondary employment to a driver during the autonomous driving operation, the secondary employment not relating to a driving operation of the vehicle if the first criterion is fulfilled.

Exemplary embodiments of the invention are directed to a method for the automatic operation of a vehicle in an autonomous driver operation requiring no user action by means of a driver assistance system that is an improvement over the prior art.

A method for the automatic operation of a vehicle in an autonomous driver operation requiring no user action by means of a driver assistance system provides, according to the invention, that a driver of the vehicle is informed in advance about an imminent automatic intervention of the driver assistance system in longitudinal and/or transverse dynamics in the autonomous driving operation by an automatic emission of a notice.

By way of the automatic emission of the notice, the driver of the autonomously driving vehicle is informed about the imminent, automatic intervention of the driver assistance system, such that acceptance of the driver regarding the autonomous driving operation is increased. By way of the notice, the driver is informed that the driver assistance system possesses information about future incidents relating to the vehicle and a driving route. Relaxed and stress-free driving in the automatic, i.e. autonomous, driving operation of the vehicle is thereby afforded to the driver of the vehicle.

An acclimatization period of the driver regarding the activatable, autonomous driving operation of the vehicle is made simpler and temporally shorter by way of the automatic emission of the notice, whereby future journeys in the autonomous driving operation become more relaxing for the driver of the vehicle. In turn, the acceptance, a degree of usage of the driver assistance system and thus also the security and comfort gains in the autonomous driving operation are thereby increased.

In one potential aspect of the method, the notice is emitted at a predetermined point in time before the automatic intervention into longitudinal and/or transverse dynamics, such that the driver of the vehicle is informed in good time that an impending traffic situation, for example imminent cornering, has been detected by corresponding components of the driver assistance system.

In a preferred embodiment, the notice about the imminent automatic intervention is emitted haptically, whereby the risk of cognitive overstimulation of the driver of the vehicle as a result of an optical and/or acoustic emission, in particular blinking and/or beeping, can at least be reduced. In other words, the driver is informed, by way of the haptic notice, about an imminent intervention by the driver assistance system without intrusive, disruptive, acoustic signals and potentially ignorable optical signals, whereby a contribution to the increase in comfort and driver relief is achieved.

In one potential embodiment, an inflatable side padding of a dynamic-driving vehicle seat is automatically filled with a gas or liquid as the notice for an approaching bend and an intervention of the driver assistance system caused thereby. The driver is informed about the imminent cornering by the filled-up side padding, whereby the driver is, at the same time, made aware of the fact that the driver assistance system is taking over the task of driving around the bend. Due to the automatic filling of the side padding before driving around the bend, the driver is in particular automatically informed as to what movement the vehicle will carry out in the near future.

As an alternative or in addition to filling the side padding, a transverse inclination of a vehicle body is automatically changed as the notice for the approaching bend and the intervention of the driver assistance system caused thereby. In particular, the transverse inclination of the vehicle body is changed in such a way so that it is as if the vehicle were driving around a relatively slight steep corner. The driver of the vehicle participates in the transverse inclination of the vehicle body, whereby the driver is also hereby made aware as to what movement the vehicle will soon be automatically carrying out.

Provision can in turn alternatively or additionally be made for the notice for the approaching bend and the intervention of the driver assistance system caused thereby to be emitted automatically by changing a transverse inclination of the vehicle seat. In this instance, the vehicle seat is relatively lightly tilted laterally, wherein the vehicle seat is preferably tilted laterally in accordance with a movement of the driver in the vehicle seat while driving around the bend.

Emitting a notice for the approaching bend and the intervention of the driver assistance system by way of an automatic change to a shape of a steering wheel caused thereby represents a further or additional alternative for the notice for the driving task being taken over by the driver assistance system. It is hereby also displayed to the driver that the vehicle is driving around the bend in the autonomous driving operation, such that the driver is not forced to handle it, in particular make a steering intervention.

It is also conceivable for the notice regarding the approaching bend, particularly preferably additionally, to be optically emitted in a display region of an instrument panel and/or in a display region of a field of vision display. In this instance, the course of a lane of traffic located ahead of the vehicle can be displayed, such that the driver of the vehicle sees that driving around a bend is imminent for the vehicle, the driving being undertaken by the driver assistance system in the autonomous driving operation.

A driving trajectory of the vehicle that is to be expected is advantageously determined with the aid of recorded signals of an environmental sensor system, with the aid of recorded data of a digital map and/or a satellite-supported navigation system and/or with the aid of determined information from vehicle-to-vehicle communication and/or with the aid of determined information from vehicle-to-infrastructure communication. A degree of transverse acceleration that is to be expected can be determined with the aid of this identified driving trajectory.

BRIEF DESCRIPTION OF THE DRAWING FIGURES

Exemplary embodiments of the invention are illustrated in greater detail below by means of a drawing.

Here is shown:

FIG. 1 schematically, a block diagram for carrying out a method for the automatic operation of a vehicle in an autonomous vehicle operation requiring no user action.

DETAILED DESCRIPTION

FIG. 1 is a block diagram for carrying out a method for the automatic operation of a vehicle 1 by a driver assistance system, wherein the vehicle 1 is operated autonomously.

The vehicle 1 possesses an environmental sensor system comprising a number of detection units arranged in and/or on the vehicle 1. Surroundings of the vehicle 1 and objects located therein are detected by the detection units, at least one of which is designed as an image-recording unit in the form of a camera. The vehicle 1 furthermore possesses vehicle-to-vehicle communication, vehicle-to-infrastructure communication, a digital map and/or a satellite-supported navigation system.

The vehicle moreover comprises a driver assistance system, by way of which it is possible to move the vehicle 1 in the autonomous driving operation without a driver taking any user action. The driver may deactivate or override the autonomous driving operation of the driver assistance system by intervening in steering and/or acceleration functions, for example by operating a steering wheel, an accelerator pedal or a brake pedal.

To carry out the autonomous driving operation, an environmental detection U is performed with the aid of recorded signals of the environmental sensor system and/or with the aid of recorded data of the digital map and/or with the aid of determined information from vehicle-to-vehicle communication and/or determined information from vehicle-to-infrastructure communication in a method step V1. As a result of information determined by the environment detection device U, a situational analysis S takes place in a next method step V2, within which the information of the environment detection U is evaluated. With the aid of the present information from the environment detection U and the evaluated information from the situational analysis S, a driving trajectory F of the vehicle 1 that is to be expected is determined in a further method step V3.

In the autonomous, i.e., in the partially or fully automatic driving operation, i.e., with the activated driver assistance system, the driver does not execute any function that is required for the driving operation, such that the driver assumes a passive role with respect to the driving operation. Depending on the degree of automation of the driver assistance system, the driver of the vehicle 1 tracks the actions carried out by the driver assistance system or concerns himself/herself with other matters regardless of a driving task.

If the driver tracks the actions that have been automatically initiated by the driver assistance system, the driver will typically wait until an automatic control action of the driver assistance system has actually occurred by a movement of the vehicle 1 and is noticeable for the driver. This can lead to the passive yet proactive driver looking forward to each action of the vehicle 1 by the driver assistance system with the highest degree of expectation. The driver looks forward to this next action of the driver assistance system with the highest degree of expectation because the driver does not know until the occurrence of the action as to whether the driver assistance system has perceived the situation in the same way and will act accordingly.

During a longitudinal control of the vehicle 1 in the autonomous or partially autonomous driving operation, an upcoming control action is signalled in good time to the driver by releasing the accelerator, for example due to a bend.

If the driver of the vehicle 1 does not trust the driver assistance system sufficiently as a result of a bad experience, and the driving of the vehicle 1 in the autonomous driving operation does not make the driver feel relaxed, acceptance of the driver assistance system may, as a result of this, be deficient.

To increase acceptance of the driver with regard to the driver assistance system and to increase comfort for the driver in the autonomous driving operation of the vehicle 1, the driver is informed about an imminent automatic intervention of the driver assistance system. To that end, at a predetermined time before an occurrence of an intervention by the driver assistance system into longitudinal and/or transverse dynamics Q of the vehicle 1, a notice H is emitted to the driver of the vehicle 1.

In order to be able to substantially rule out the risk of cognitive overstimulation of the driver of the vehicle 1 by an emission of acoustic and/or optical signals, which may be felt as being tiresome and/or disruptive, the notice H is emitted haptically to the driver.

In particular with the possibility to carry out cornering or driving around an obstacle in the autonomous driving operation without reducing a current driving speed of the vehicle 1, the haptic notice H is emitted to the driver of the vehicle 1.

With the aid of the determined driving trajectory F of the vehicle 1 by the environment detection U and the situational analysis S, in a subsequent method step V4, transverse dynamics Q of the vehicle 1 that are to be expected are determined at a point in time that is dependent on the current driving speed.

The point in time of the intervention of the driver assistance system into transverse dynamics Q of the vehicle 1 is determined, such that, in a next method step V5, provision is made to emit the haptic notice H for the imminent intervention.

Provided that the vehicle 1 possesses a dynamic-driving vehicle seat, provision is made for a seat padding that is able to be filled with a gas or liquid to be controlled and automatically filled before the intervention into transverse dynamics Q of the vehicle 1 takes place.

By filling the seat padding as the haptic notice H with respect to the imminent cornering undertaken in the autonomous driving operation, the driver is made aware as to what movement the vehicle 1 will carry out after the determined period of time. The driver therefore knows that the driver assistance system is taking over the driving task for driving around the bend or for driving around the obstacle, and the driver does not have to intervene.

Provision is alternatively or additionally made for the vehicle body to incline transversely as if the vehicle 1 were driving around a relatively slight steep corner, in order to indicate to the driver of the vehicle 1 haptically that the bend is being driven around in the autonomous driving operation.

In addition, provision is alternatively or additionally made for the vehicle seat to incline transversely, so to tilt laterally, and/or for the shape of a steering wheel of the vehicle 1 to change, if it is detected that the hands of the driver are positioned on the steering wheel.

Moreover, an optical notice H may preferably be emitted to the driver of the vehicle 1 in addition to the haptic notice H. Here, the emission of the optical notice H can take place in a display region of an instrument panel of the vehicle 1 and/or in a display region of a field of vision display, the so-called head-up display.

In particular, the haptic notice H and/or the optical notice H of, for example, between one second and six seconds as the predetermined period of time, are emitted haptically before the point in time of the intervention of the driver assistance system. Here, an intensity of the emission of the notice H or the notices H, as well as the period of time in which the emission is to take place before the intervention, may be changed by the driver of the vehicle 1 by manual input E.

If there is provision for the driving task to be given back to the driver of the vehicle 1, since, for example, a portion of a motorway that is able to be driven along in the autonomous driving operation has ended or because a maximum driving speed has been achieved when driving in heavy traffic, the driver is prompted to do so by means of optical and acoustic signals.

Although the present invention has been described above by means of embodiments with reference to the enclosed drawings, it is understood that various changes and developments can be implemented without leaving the scope of the present invention, as it is defined in the enclosed claims.

The invention claimed is:

1. A method, comprising:
   automatically operating a vehicle, by a driver assistance system, in an autonomous driving operation requiring no user action; and
   informing a driver of the vehicle about an imminent automatic intervention of the driver assistance system into longitudinal or transverse dynamics in the autonomous driving operation by an automatic emission of a notice,
   wherein the notice is emitted haptically and the notice is emitted at a predetermined period of time before the automatic intervention into longitudinal or transverse dynamics.

2. The method of claim 1, wherein the notice involves automatically filling an inflatable side padding of a dynamic-driving vehicle seat with a gas or liquid as the notice, and wherein the notice relates to an approaching bend.

3. The method of claim 2, wherein the notice further comprises a transverse inclination of a vehicle seat is changed automatically.

4. The method of claim 1, wherein the notice relates to an approaching bend, and wherein the notice regarding the approaching bend is optically emitted in a display region of an instrument panel or in a display region of a field of vision display.

5. The method of claim 1, further comprising:
   determining a driving trajectory of the vehicle that is to be expected using recorded signals of an environmental sensor system, using recorded data of a digital map or a satellite-supported navigation system, using determined information from vehicle-to-vehicle communication, or using determined information from vehicle-to-infrastructure communication.

6. The method of claim 1, wherein the autonomous driving operation is deactivated or overridden by an intervention of the driver in the steering or acceleration functions of the driver assistance system.

7. A method, comprising:
   automatically operating a vehicle, by a driver assistance system, in an autonomous driving operation requiring no user action; and
   informing a driver of the vehicle about an imminent automatic intervention of the driver assistance system into longitudinal or transverse dynamics in the autonomous driving operation by an automatic emission of a notice,
   wherein the notice is emitted haptically and the notice is emitted at a predetermined period of time before the automatic intervention into longitudinal or transverse dynamics, wherein the notice is a change in a transverse inclination of a vehicle body, and wherein the notice relates to an approaching bend.

8. The method of claim 7, wherein the notice further comprises a transverse inclination of a vehicle seat is changed automatically.

9. The method of claim 7, wherein the notice further involves automatically filling an inflatable side padding of a dynamic-driving vehicle seat with a gas or liquid as the notice, and wherein the notice relates to an approaching bend.

10. The method of claim 7, wherein the notice relates to an approaching bend, and wherein the notice regarding the approaching bend is optically emitted in a display region of an instrument panel or in a display region of a field of vision display.

11. The method of claim 7, further comprising:
    determining a driving trajectory of the vehicle that is to be expected using recorded signals of an environmental sensor system, using recorded data of a digital map or a satellite-supported navigation system, using determined information from vehicle-to-vehicle communication, or using determined information from vehicle-to-infrastructure communication.

12. The method of claim 7, wherein the autonomous driving operation is deactivated or overridden by an intervention of the driver in the steering or acceleration functions of the driver assistance system.

13. A method, comprising:
    automatically operating a vehicle, by a driver assistance system, in an autonomous driving operation requiring no user action; and
    informing a driver of the vehicle about an imminent automatic intervention of the driver assistance system into longitudinal or transverse dynamics in the autonomous driving operation by an automatic emission of a notice, wherein the notice is emitted haptically and the notice is emitted at a predetermined period of time before the automatic intervention into longitudinal or transverse dynamics, wherein the notice is an automatic change in a shape of a steering wheel, wherein the notice relates to an approaching bend.

14. The method of claim 13, wherein the notice further involves automatically filling an inflatable side padding of a dynamic-driving vehicle seat with a gas or liquid as the notice, and wherein the notice relates to an approaching bend.

15. The method of claim 13, wherein the notice relates to an approaching bend, and wherein the notice regarding the approaching bend is optically emitted in a display region of an instrument panel or in a display region of a field of vision display.

16. The method of claim 13, further comprising:
determining a driving trajectory of the vehicle that is to be expected using recorded signals of an environmental sensor system, using recorded data of a digital map or a satellite-supported navigation system, using determined information from vehicle-to-vehicle communication, or using determined information from vehicle-to-infrastructure communication.

17. The method of claim 13, wherein the autonomous driving operation is deactivated or overridden by an intervention of the driver in the steering or acceleration functions of the driver assistance system.

* * * * *